United States Patent
Muramatsu

(10) Patent No.: US 11,860,037 B2
(45) Date of Patent: Jan. 2, 2024

(54) INTERFEROMETER MOVABLE MIRROR POSITION MEASUREMENT APPARATUS AND FOURIER TRANSFORM INFRARED SPECTROSCOPY

(71) Applicant: SHIMADZU CORPORATION, Kyoto (JP)

(72) Inventor: Takashi Muramatsu, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 513 days.

(21) Appl. No.: 17/269,296

(22) PCT Filed: Sep. 3, 2018

(86) PCT No.: PCT/JP2018/032655
§ 371 (c)(1),
(2) Date: Feb. 18, 2021

(87) PCT Pub. No.: WO2020/049620
PCT Pub. Date: Mar. 12, 2020

(65) Prior Publication Data
US 2021/0190590 A1    Jun. 24, 2021

(51) Int. Cl.
*G01J 3/45* (2006.01)
*G01B 9/02* (2022.01)
*G01B 11/14* (2006.01)

(52) U.S. Cl.
CPC ............ *G01J 3/45* (2013.01); *G01B 9/02044* (2013.01); *G01B 11/14* (2013.01)

(58) Field of Classification Search
CPC ........ G01J 3/45; G01J 3/453; G01B 9/02044; G01B 11/14; G01B 9/02072; G01B 9/02083; G01B 2290/70; G01B 9/02081
See application file for complete search history.

(56) References Cited

U.S. PATENT DOCUMENTS

| 4,799,001 A | * 1/1989 | Burch .................... G01J 3/4535 356/452 |
| 8,169,616 B2 | 5/2012 | Johnson et al. |

(Continued)

FOREIGN PATENT DOCUMENTS

| CN | 103201603 A | 7/2013 |
| CN | 103403528 A | 11/2013 |

(Continued)

OTHER PUBLICATIONS

Office Action dated Nov. 22, 2022 issued by the Chinese Patent Office in Chinese Application No. 201880096674.2.

(Continued)

*Primary Examiner* — David P Porta
*Assistant Examiner* — Mamadou Faye
(74) *Attorney, Agent, or Firm* — Sughrue Mion, PLLC

(57) ABSTRACT

An interferometer movable mirror position measurement apparatus for determining a position of a movable mirror of an interferometer. The interferometer movable mirror position measurement apparatus including: a laser light source; a phase separation optical system configured to make first light and second light separately detected; a signal conversion unit configured to detect the first light and the second light in synchronization with a position of a movable mirror to generate a first sinusoidal wave signal and a second sinusoidal wave signal, respectively; a phase calculation unit configured to perform normalization and phase difference correction on each of the first sinusoidal wave signal and the second sinusoidal wave signal, and then calculate a phase of the first sinusoidal wave signal or the second sinusoidal wave signal at each time point; and a movable mirror position determination unit configured to determine a position of the movable mirror at a predetermined time point.

6 Claims, 5 Drawing Sheets

(56) References Cited

U.S. PATENT DOCUMENTS

| | | | |
|---|---|---|---|
| 2009/0040488 A1* | 2/2009 | Shibazaki | G03F 7/70508 355/72 |
| 2011/0199614 A1 | 8/2011 | Johnson et al. | |
| 2013/0222790 A1 | 8/2013 | Hirao | |
| 2013/0335740 A1 | 12/2013 | Ishimaru | |
| 2014/0204388 A1 | 7/2014 | Osawa et al. | |

FOREIGN PATENT DOCUMENTS

| | | |
|---|---|---|
| CN | 103961056 A | 8/2014 |
| JP | 02-253103 A | 10/1990 |
| JP | H07-198317 A | 8/1995 |
| JP | 07-119564 B2 | 12/1995 |
| JP | 2001324354 A | 11/2001 |
| JP | 2011-075404 A | 4/2011 |
| JP | 2011-169891 A | 9/2011 |

OTHER PUBLICATIONS

Notice of Allowance dated Jun. 6, 2023 issued for the corresponding Chinese Patent Application No. 201880096674.2.
Office Action dated Mar. 2, 2022 in Chinese Application No. 201880096674.2.
J. H. Bruning, et al., "Digital Wavefront Measuring Interferometer for Testing Optical Surfaces and Lenses", Applied Optics, Nov. 1974, vol. 13, No. 11, pp. 2693-2703.
International Search Report for PCT/JP2018/032655 dated Nov. 27, 2018 (PCT/ISA/210).
Written Opinion for PCT/JP2018/032655 dated Nov. 27, 2018 (PCT/ISA/237).

* cited by examiner

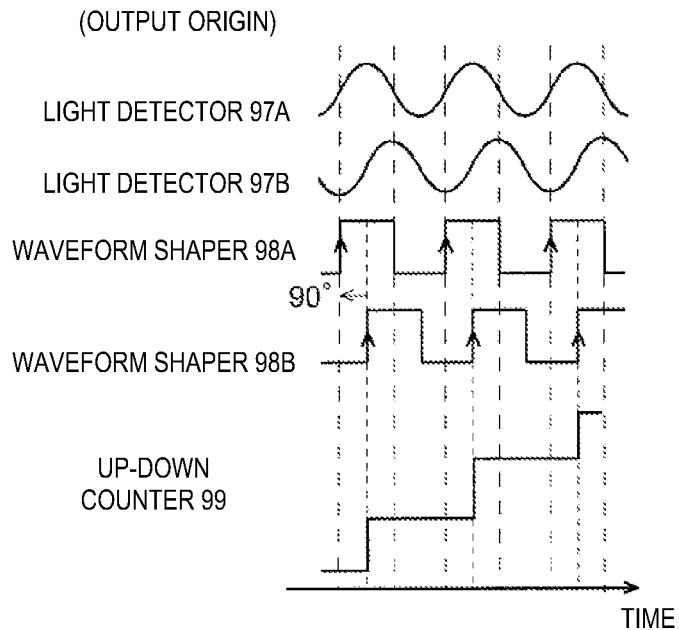
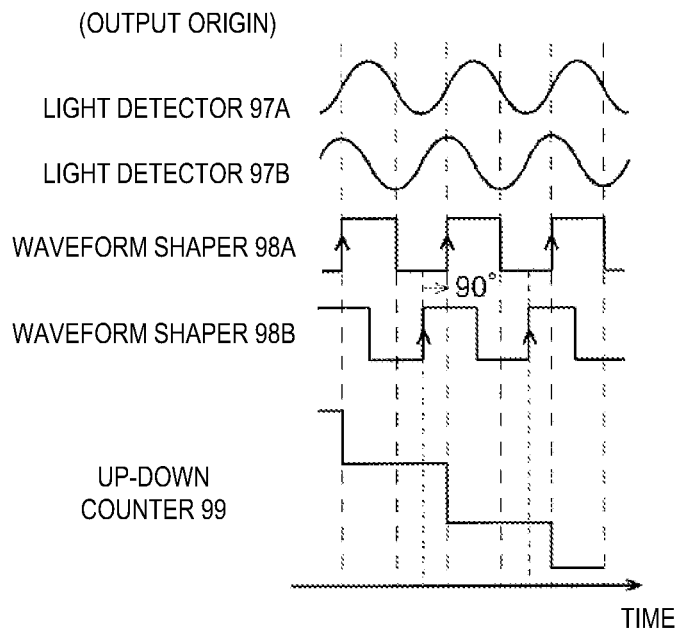

INTERFEROMETER MOVABLE MIRROR POSITION MEASUREMENT APPARATUS AND FOURIER TRANSFORM INFRARED SPECTROSCOPY

CROSS REFERENCE TO RELATED APPLICATIONS

This application is a National Stage of International Application No. PCT/JP2018/032655 filed Sep. 3, 2018.

TECHNICAL FIELD

The present invention relates to an interferometer movable mirror position measurement apparatus for determining the position of a movable mirror of an interferometer having a beam splitter, a fixed mirror, and the movable mirror, and a Fourier transform infrared spectroscopy (FTIR) equipped with the interferometer movable mirror position measurement apparatus.

BACKGROUND ART

In an FTIR, an interferometer such as a Michelson interferometer generates interference light with an amplitude changing with time, and a sample is irradiated with the light, and the transmitted light passing through the sample or reflected light from the sample is detected as an interferogram. By performing Fourier transform processing on this interferogram, a spectrum with the wavenumber (or wavelength) on the horizontal axis and the intensity on the vertical axis is obtained. Here, the Michelson interferometer is a device including a beam splitter (half mirror), a fixed mirror, and a movable mirror, where light is split into two beams by the beam splitter, and one beam is reflected by the fixed mirror, while the other beam is reflected by the movable mirror. These two reflected light beams interfere with each other. By moving the movable mirror, the intensity of the obtained interference light changes with time.

One of the control methods of moving the movable mirror in a Michelson interferometer is a method called quadrature control (Patent Literature 1). In this method, a laser interferometer including a laser light source, a beam splitter, a fixed mirror, and a movable mirror is used, where the laser light source is provided separately from the Michelson interferometer while the beam splitter, the fixed mirror and the movable mirror are all common to the Michelson interferometer. The position of the movable mirror is obtained from the difference in the optical path length (optical path difference) between the light reflected by the fixed mirror and the light reflected by the movable mirror. FIG. 5 shows an example of a laser interferometer used in the method. A laser interferometer 90 has a laser light source 91 which emits a linearly polarized beam, a beam splitter 92, a fixed mirror 93, and a movable mirror 94 which are of a Michelson interferometer. The laser interferometer 90 further has an ⅛ wavelength plate 95 provided between the beam splitter 92 and the fixed mirror 93, and arranged so that the polarization plane inclines with respect to the linear polarization of the beam. On the emission side of the beam splitter 92, a polarization beam splitter 96 which separates p-polarization beam and s-polarization beam is disposed, and a first light detector 97A is disposed on the emission side of the p-polarization beam and a second light detector 97B is disposed on the emission side of the s-polarization beam. The first light detector 97A is connected to a first waveform shaper 98A, and the second light detector 97B is connected to a second waveform shaper 98B, whereas the first waveform shaper 98A and the second waveform shaper 98B are connected to an up-down counter 99.

In this laser interferometer 90, a linearly polarized beam is emitted from the laser light source 91, and the beam is split into two beams by the beam splitter 92. One of the split beams is reflected by the fixed mirror 93 and the other is reflected by the movable mirror 94. Here, the beam reflected by the movable mirror 94 remains linearly polarized, whereas the linearly polarized beam reflected by the fixed mirror 93 becomes circularly polarized or elliptically polarized by passing through the ⅛ wavelength plate 95 twice. These two beams are superposed by the beam splitter 92 to become interference light, and the interference light is separated into p-polarization beam and s-polarization beam by the polarization beam splitter 96. The separated p-polarization beam enters the first light detector 97A, and the s-polarization beam enters the second light detector 97B. The first light detector 97A and the second light detector 97B each convert the intensity of the interference light to a current signal which is a fringe signal. As shown in FIGS. 6A-6B, the fringe signal of p-polarization beam and the fringe signal of s-polarization beam become periodic signals with respect to time, and one period corresponds to a time in which the movable mirror 94 moves by a distance of half wavelength of the laser light source 91. These fringe signals are shaped into pulse signals by the first waveform shaper 98A and the second waveform shaper 98B, and are input to the up-down counter 99.

Here, when the movable mirror 94 moves away from the beam splitter 92, one (In case of FIGS. 6A-6B, the p-polarization beam. Depending on the rotational direction of the circularly polarized beam or the elliptically polarized beam, it may be the polarization beam opposite to that in FIGS. 6A-6B, i.e., s-polarization. The same applies hereinafter.) of the p-polarization fringe signal and the s-polarization fringe signal is delayed in phase by 90° with respect to the other (In FIGS. 6A-6B, s-polarization). When the movable mirror 94 approaches the beam splitter 92, the one (In case of FIGS. 6A-6B, the p-polarization beam) is advanced in phase by 90° with respect to the other (In case of FIGS. 6A-6B, the s-polarization beam). The up-down counter 99 counts +1 when the pulse signal by the one fringe signal is input with a phase delay of 90° with respect to the pulse signal by the other fringe signal, and counts −1 when the pulse signal by the other fringe signal is input with a phase delay of 90° with respect to the pulse signal by the one fringe signal. By adding these counts by the up-down counter, forward or backward movement by the optical path difference of one wavelength of the laser beam, i.e., the distance of half wavelength in the movable mirror 94, is measured, and the position of the movable mirror 94 is determined.

CITATION LIST

Patent Literature

Patent Literature 1: JP H02-253103 A

SUMMARY OF INVENTION

Technical Problem

In the conventional quadrature control, since the position of the movable mirror is determined in units of the half wavelength of the laser beam, it is impossible to determine the position when the movable mirror is at a position midway of the half wavelength. In the FTIR, a method called a step scan is known in which a unit movement is repeated where the unit movement involves moving the movable mirror by the distance of half wavelength, halting the movable mirror, and recording an interferogram. In order to perform the control of halting the movable mirror, it is necessary to determine an error from a target halting position with a position resolution sufficiently higher than half wavelength. However, in the conventional quadrature control, since the position resolution is half wavelength, it is impossible to perform the step scanning.

The problem to be solved by the present invention is to provide an interferometer movable mirror position measurement apparatus capable of determining a position of a movable mirror of an interferometer with high resolution irrespective of the position, and an FTIR equipped with the interferometer movable mirror position measurement apparatus.

Solution to Problem

The present invention made to solve the above problems is an apparatus for determining a position of a movable mirror of an interferometer, the interferometer having a beam splitter, a fixed mirror, and the movable mirror, the apparatus comprising:
a) a laser light source;
b) a phase separation optical system configured to cause first light and second light to be separately detected, the first and second light being generated through the emission from the laser light source and the reflection by the fixed mirror and the movable mirror, respectively, the first and second light having different phases from each other;
c) a signal conversion unit configured to detect the first light and the second light, which corresponds to a position of the movable mirror, and to generate a first electrical sinusoidal wave signal and a second electrical sinusoidal wave signal, respectively;
d) a phase calculation unit configured to perform normalization and phase difference correction on each of the first sinusoidal wave signal and the second sinusoidal wave signal, and then calculate a phase of the first sinusoidal wave signal or the second sinusoidal wave signal in real time; and
e) a movable mirror position determination unit configured to determine a position of the movable mirror at a predetermined time point from a phase at the predetermined time point on a basis of a relationship between a position of the movable mirror and the phase.

At each time point, the first or second electrical sinusoidal wave, which is obtained by the phase calculation unit, has a phase having a predetermined relationship with a position of the movable mirror, which enables determination of the position of the movable mirror. Subsequently, this generates the determined position of the movable mirror with high resolution. It should be noted that a position of the movable mirror can be determined at any position, let alone at a specific position where the movable mirror is moved by half wavelength.

Examples of the phase separation optical system include a system in which light reflected by the fixed mirror and light reflected by the movable mirror are polarized differently so that they can be detected separately. For such phase separation optical system, it is possible to use, for example, a laser light source that emits a linearly polarized beam, a ⅛ wavelength plate disposed between the beam splitter and the fixed mirror, and a polarization beam splitter disposed at a subsequent stage of the beam splitter which are used in the quadrature control described above. Alternatively, the ⅛ wavelength plate may be disposed between a beam splitter and a movable mirror. Further, a polarizer other than a ⅛ wavelength plate may be used.

In the present invention, the term "phase difference correction" means correction of a first sinusoidal wave signal and a second sinusoidal wave signal so that the phase difference between those two sinusoidal wave signals becomes a predetermined value (typically 90°).

The phase calculation unit normalizes the fringe signal by using the average value and amplitude of the first sinusoidal wave signal and the second sinusoidal wave signal, and performs the phase difference correction by using the phase difference between the first sinusoidal wave signal and the second sinusoidal wave signal. Values of the average and amplitude of the first sinusoidal wave signal and the second sinusoidal wave signal are treated as parameters required to calculate the phase.

For these parameters, it is necessary to calibrate before calculating the phase of the first sinusoidal wave signal and the phase of the second sinusoidal wave signal. In order to obtain these calibration values of the parameters, it is desirable that the interferometer movable mirror position measurement apparatus according to the present invention further includes a parameter calibration unit configured to repeat performing processing of: acquiring a plurality of intensity values of the first sinusoidal wave signal and the second sinusoidal wave signal at predetermined phase intervals; obtaining an average value of the plurality of acquired intensity values for each of the first sinusoidal wave signal and the second sinusoidal wave signal; and performing a discrete Fourier transform on the plurality of acquired intensity values to obtain an amplitude and a phase difference between the first sinusoidal wave signal and the second sinusoidal wave signal.

It is possible to determine the position of the movable mirror more accurately by thus performing normalization using an average value and amplitude obtained on the basis of the plurality of intensity values of the first sinusoidal wave signal and the second sinusoidal wave signal acquired at predetermined phase intervals, and calculating the phase on the basis of the first sinusoidal wave signal and the second sinusoidal wave signal after the normalization.

An FTIR according to the present invention includes
an infrared light interference optical system having an infrared light source, a beam splitter, a fixed mirror, and a movable mirror,
an infrared light detector configured to detect interference light generated by the infrared light interference optical system, and
the apparatus mentioned above.

The FTIR according to the present invention can further include a step scan control unit configured to control the movable mirror so as to repeat performing an operation of halting the movable mirror at different positions at predetermined regular intervals by performing control using a position signal from the movable mirror position determination unit, and acquiring, a plurality of times, a detection signal from the infrared light detector at each of the positions. This allows the step scan to be performed with high accuracy.

Advantageous Effects of Invention

According to the interferometer movable mirror position measurement apparatus and the FTIR according to the present invention, it is possible to determine a position of a movable mirror of an interferometer with high resolution irrespective of the position.

BRIEF DESCRIPTION OF DRAWINGS

FIG. 6A is a graph showing the temporal change of a fringe signal, a pulse signal in which a waveform of the fringe signal is shaped, and an output signal of an up-down counter when a movable mirror moves away from the beam splitter in a conventional laser interferometer, and FIG. 6B is the same when a movable mirror approaches the beam splitter.

DESCRIPTION OF EMBODIMENTS (1) One Embodiment of Interferometer Movable Mirror Position Measurement Apparatus (1-1) Configuration of Interferometer Movable Mirror Position Measurement Apparatus of Present Embodiment An embodiment of an interferometer movable mirror position measurement apparatus according to the present invention will be described with reference to FIGS. 1A-1B. An interferometer movable mirror position measurement apparatus 10 of the present embodiment is an apparatus incorporated into an FTIR 20 described later, and, as shown in FIG. 1A, has a laser light source 11, a ⅛ wavelength plate 15, a polarization beam splitter 16, a first light detector 17A and a second light detector 17B, a phase calculation unit 18, and a movable mirror position determination unit 19. The ⅛ wavelength plate 15 and the polarization beam splitter 16 correspond to the phase separation optical system described above, and the first light detector 17A and the second light detector 17B correspond to the signal conversion unit described above. FIG. 1A also shows a beam splitter 22, a fixed mirror 23, and a movable mirror 24 of the FTIR 20.

Figure 1A:
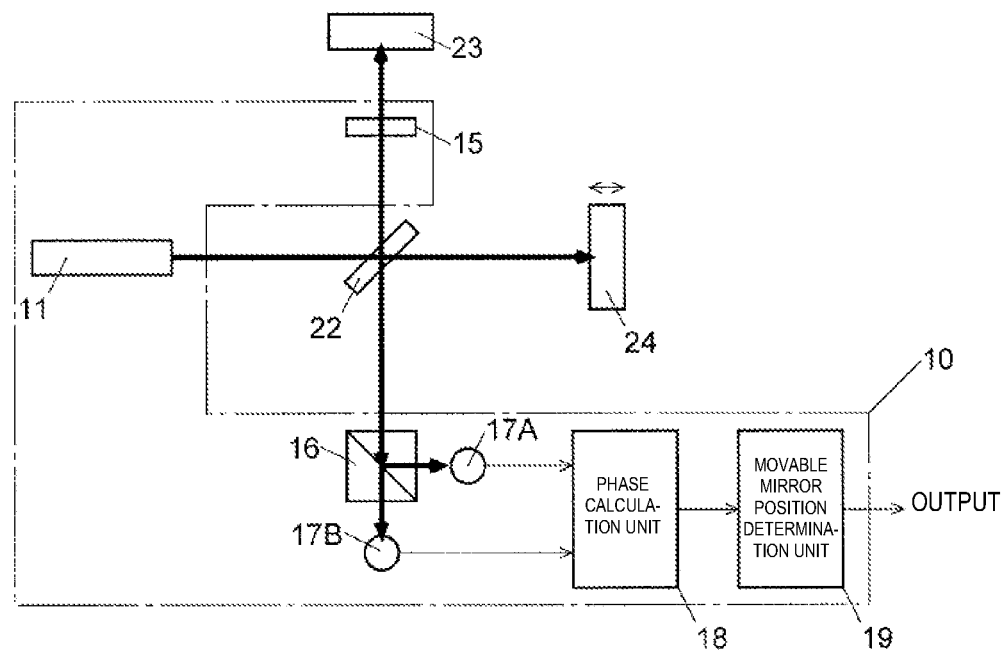
FIG. 1A is a schematic diagram showing an embodiment of an interferometer movable mirror position measurement apparatus according to the present invention.

The laser light source 11 emits a linearly polarized laser beam. The ⅛ wavelength plate 15 is disposed in the FTIR 20 between the beam splitter 22 and the fixed mirror 23. The polarization beam splitter 16 is disposed in the FTIR 20 on the emission side of the beam splitter 22. The first light detector 17A is disposed on the p-polarization beam emission side of the polarization beam splitter 16, and the second light detector 17B is disposed on the s-polarization beam emission side of the polarization beam splitter 16. The first light detector 17A and the second light detector 17B correspond to the signal conversion unit described above.

Figure 1B:
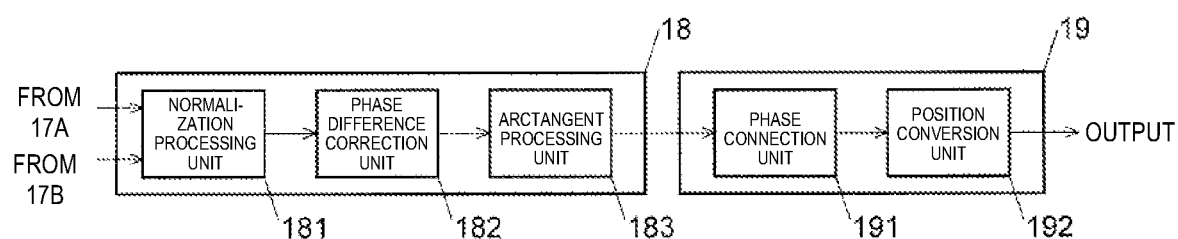
FIG. 1B is a block diagram showing functions of a phase calculation unit and a movable mirror position determination unit in the interferometer movable mirror position measurement apparatus.

As shown in FIG. 1B, the phase calculation unit 18 has a normalization processing unit 181, a phase difference correction unit 182, and an arctangent processing unit 183. The movable mirror position determination unit 19 has a phase connection unit 191 and a position conversion unit 192. Each of these units is embodied by hardware of a computer such as a logic circuit performing digital signal processing, a CPU, and a memory and software. The functions of each of these units will be described later.

(1-2) Operation of Interferometer Movable Mirror Position Measurement Apparatus of Present Embodiment The operation of the interferometer movable mirror position measurement apparatus 10 of the present embodiment will be described. The laser light source 11 emits a linearly polarized beam. This beam is split into two beams by the beam splitter 22 of the FTIR 20. One of the split beams is reflected by the fixed mirror 23 of the FTIR 20 and the other is reflected by the movable mirror 24 of the FTIR 20. The beam reflected by the fixed mirror 23 becomes circular polarization beam or elliptical polarization beam by passing through the ⅛ wavelength plate 15 twice before and after the reflection. These two beams are superposed by the beam splitter 22 of the FTIR 20, and enter the polarization beam splitter 16 of the interferometer movable mirror position measurement apparatus 10. The polarization beam splitter 16 separates the superposed beam into p-polarization beam and s-polarization beam. The p-polarization beam enters the first light detector 17A, and the s-polarization beam enters the second light detector 17B. The first light detector 17A converts incident p-polarization beam into an electric signal, and the second light detector 17B converts incident s-polarization beam into an electric signal.

The two electric signals thus generated by the first light detector 17A and the second light detector 17B become sinusoidal waves whose intensity exhibits one-period change every time the movable mirror 24 moves by one wavelength of the laser beam in the optical path difference length. Hereinafter, the electric signal generated by the first light detector 17A is referred to as a first sinusoidal wave signal $I_A$, and the electric signal generated by the second light detector 17B is referred to as a second sinusoidal wave signal $I_B$.

The phase calculation unit 18 performs the following operation on the first sinusoidal wave signal $I_A$ and the second sinusoidal wave signal $I_B$.

Where the amplitudes of the first sinusoidal wave signal $I_A$ and the second sinusoidal wave signal $I_B$ are $a_A$ and $a_B$, respectively, the average values of the first sinusoidal wave signal $I_A$ and the second sinusoidal wave signal $I_B$ are $b_A$ and $b_B$, respectively, and the phase difference between the two sinusoidal wave signals is $\Delta\varphi$, the phases of those two sinusoidal wave signals can be expressed as $(\varphi+(\Delta\varphi/2))$ and $(\varphi-(\Delta\varphi/2))$, respectively. Expressing the phases of the two sinusoidal wave signals in this manner, the first sinusoidal wave signal $I_A$ and the second sinusoidal wave signal $I_B$ are expressed as follows $$I_A = a_A \cos(\varphi + (\Delta\varphi/2)) + b_A \quad (1a)$$

$$I_B = a_B \cos(\varphi - (\Delta\varphi/2)) + b_B \quad (1b).$$

If obtaining in advance the five parameters mentioned here, i.e., the amplitudes $a_A$ and $a_B$, the average values $b_A$ and $b_B$, and the phase difference $\Delta\varphi$, it is possible to calculate the position of the movable mirror by the method described below. The calculation accuracy of these five parameters greatly affects the calculation accuracy of the final movable mirror position. In addition, these five parameters are determined by the setup of the optical system, and are always constant values if the optical system is rigid ideally, but in an actual optical system in an actual device, they change caused by a change of detected laser beam intensity due to movement of the movable mirror or a slight change in laser coherence. Therefore, by performing calibration of these five parameters with high accuracy and in real time, the accuracy of the position of the movable mirror is improved. An example of a calibration method will be described below.

By subtracting the average value from and dividing the amplitude by these two sinusoidal wave signals $I_A$ and $I_B$, respectively, the normalization processing unit 181 generates two normalized sinusoidal wave signals $J_A$ and $J_B$ on which normalization processing has been performed, $$J_A = (I_A - b_A)/a_A \quad (2a)$$

$$J_B = (I_B - b_B)/a_B \quad (2a)$$

Performing the normalization processing in this way eliminates an influence of a difference between the amplitudes and the average values of the two polarization beam caused by a difference between the transmittance of one polarization beam and the reflectance of the other polarization beam in the polarization beam splitter 16, or a difference in detection sensitivity between the first light detector 17A and the second light detector 17B.

Next, the phase difference correction unit 182 performs, on these two normalized sinusoidal wave signals $J_A$ and $J_B$, processing of generating two normalized sinusoidal wave signals c and s after phase difference correction whose phase difference is corrected to be 90°. Specifically, by performing the processing by the following Expression (3),

[Math. 1]

$$\begin{pmatrix} c \\ s \end{pmatrix} = \begin{pmatrix} \sin(\Delta\phi/2) & \sin(\Delta\phi/2) \\ -\cos(\Delta\phi/2) & \cos(\Delta\phi/2) \end{pmatrix} \begin{pmatrix} J_A \\ J_B \end{pmatrix} \quad (3)$$

the normalized sinusoidal wave signals c and s after phase difference correction become $$c = \sin(\Delta\varphi) \cdot \cos\varphi = \sin(\Delta\varphi) \cdot \sin(\varphi + \pi/2) \quad (4a)$$

$$s = \sin(\Delta\varphi) \cdot \sin\varphi \quad (4b)$$

and the phase difference between them becomes 90°.

The arctangent processing unit 183 divides one signal s of the two normalized sinusoidal wave signals after phase difference correction by the other signal b, and then obtain an arctangent. Then, from Expressions (4a) and (4b)

$$\varphi = \arctan(s/c) \quad (5)$$

and the phase $\varphi$ is calculated.

Next, the movable mirror position determination unit 19 converts the phase $\varphi$ obtained by the phase calculation unit 18 into a position x of the movable mirror. In this conversion, first, the phase connection unit 191 performs phase connection processing on $\varphi$ shown in Expression (5). The phase connection processing refers to the processing of connecting discontinuities (sudden change in data) occurring when the phase is $-\pi$ and $+\pi$ because $\varphi$ is an arctangent function so that they become continuous data. Here, the phase connection processing is displayed by a function of "Unwrap($\varphi$)".

The position conversion unit 192 uses the phase $\varphi$ after the phase connection and a wavelength $\lambda$ of the laser beam to determine the position x of the movable mirror by the following Expression (6)

$$x = (\lambda/4\pi) \text{Unwrap}(\varphi) \quad (6).$$

In the interferometer according to the present invention, by performing the above processing, it is possible to determine the position x not only at a certain timing such as when the movable mirror moves by one wavelength but also at an any timing, and hence it is possible to determine the position of the movable mirror with high resolution.

Figure 2:
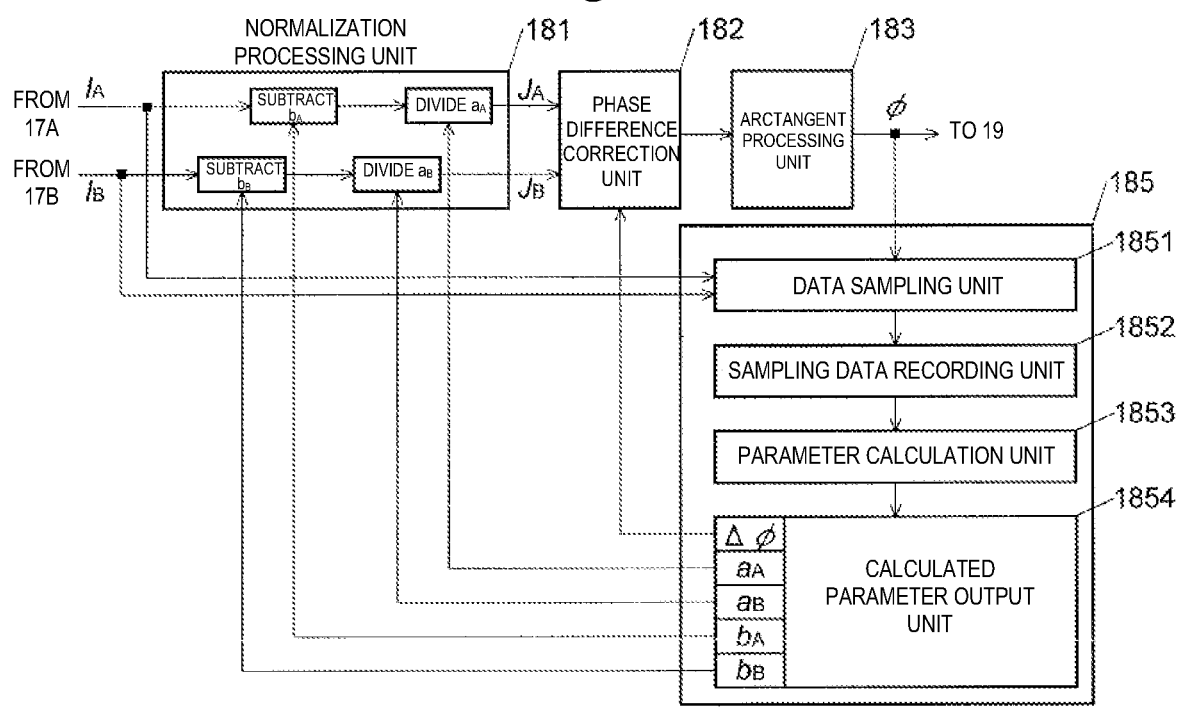
FIG. 2 is a block diagram showing a function of a parameter calculation unit used in an interferometer movable mirror position measurement apparatus of the present embodiment.

(1-3) Examples of Configurations and Operations of Calibrating Amplitudes $a_A$ and $a_B$, Average Values $b_A$ and $b_B$, and Phase Difference $\Delta\varphi$ Next, the configuration and operation of a parameter calibration unit 185 for calibrating the amplitudes $a_A$ and $a_B$, the average values $b_A$ and $b_B$, and the phase difference $\Delta\varphi$, which are parameters used in the phase calculation unit 18 will be described with reference to FIG. 2. The parameter calibration unit 185 has a data sampling unit 1851, a sampling data recording unit 1852, a parameter calculation unit 1853, and a calculated parameter output unit 1854.

Figure 3A:
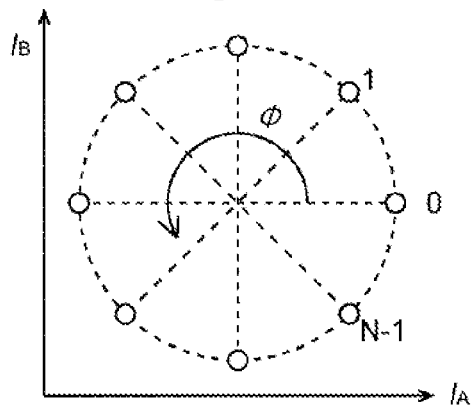
FIGS. 3A-3C are views showing an example of timing at which the parameter calculation unit acquires data.

The data sampling unit 1851 acquires, at each predetermined timing, data of the first sinusoidal wave signal $I_A$ and the and the second sinusoidal wave signal $I_B$ generated by the first light detector 17A and the second light detector 17B, and the phase $\varphi$ before phase connection output from the arctangent processing unit 183. Here, as indicated by circles in FIG. 3A, for example, the timings of acquiring these values can be the timing obtained by dividing one period of the first sinusoidal wave signal $I_A$ and the second sinusoidal wave signal $I_B$ into N equal parts (N is an integer which is 2 or greater), i.e., the N timings (n is an integer between 0 and (N−1)) when the phase $\varphi$ is $(2\pi n/N)$. In FIG. 3A, with the phase difference $\Delta\varphi$ between the first sinusoidal wave signal $I_A$ and the second sinusoidal wave signal $I_B$ being approximately 90° (regarded as 90°), the relationship between them is indicated by circles in the graph where the intensity of $I_A$ is represented by the vertical axis and the intensity of $I_B$ is represented by the horizontal axis.

Figure 3B:
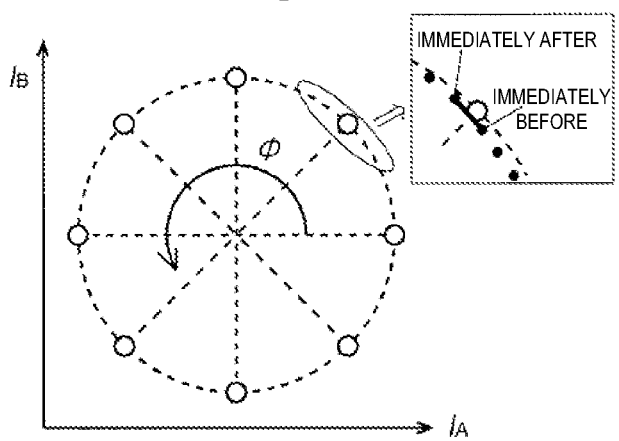
Figure 3C:
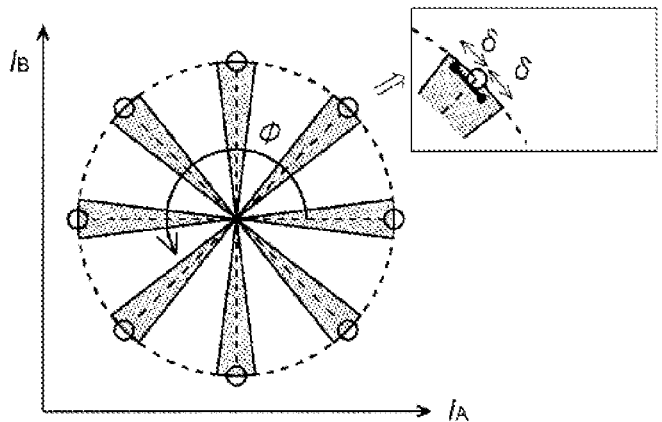

The timings of acquiring the data of $I_A$, $I_B$, and $\varphi$ are not limited to the case of FIG. 3A, and can be the timings shown in FIG. 3B and FIG. 3C. In FIG. 3B, while repeatedly acquiring data at a sampling rate sufficiently shorter than the timing whose phase $\varphi$ is $(2\pi n/N)$, data obtained immediately before and immediately after the phase $\varphi$ becomes $(2\pi n/N)$ are extracted to interpolate both the data, thereby acquiring the data at $(2\pi n/N)$. Instead of interpolating both the data, an average value of both the data may be calculated, or only data of either immediately before or immediately after the phase $\varphi$ becomes $(2\pi n/N)$ may be used. The method using the data obtained immediately before and immediately after the phase $\varphi$ becomes $(2\pi n/N)$ in this manner is effective in a case where the periods of the first sinusoidal wave signal $I_A$ and the second sinusoidal wave signal $I_B$ are sufficiently long and a sufficiently large amount of data can be acquired for each $(2\pi/N)$.

On the other hand, in a case where the periods of the first sinusoidal wave signal $I_A$ and the second sinusoidal wave signal $I_B$ are sufficiently short, as shown in FIG. 3C, data is extracted only when the phase $\varphi$ falls within the range of $(2\pi n/N \pm \delta)$ ($\delta$ is a value sufficiently smaller than $2\pi/N$) while repeatedly acquiring data at a sampling rate as short as possible. In a case where the period is so short that the phase $\varphi$ changes beyond $2\pi/N$ during one sampling, the number of data acquirable in each phase of $(2\pi n/N)$ during one period is 0 or at most 1. However, by acquiring data over a plurality of periods, it is possible to acquire two or more data in each phase of $(2\pi n/N)$. Thus, in each phase of $(2\pi n/N)$, by interpolating the acquired two data, it is possible to acquire the data in each phase of ($2\pi n/N$). Alternatively, an average value of two acquired data may be calculated, or only one acquired data may be used.

The sampling data recording unit 1852 records data of $I_A$, $I_B$, and φ acquired in each phase in the data sampling unit 1851.

The parameter calculation unit 1853 acquires the data of $I_A(n)$, $I_B(n)$, and φ(n) in a phase where n is within a predetermined range, recorded in the sampling data recording unit 1852, and obtains, on the basis of the data, calibration values of the amplitudes $a_A$ and $a_B$ of $I_A$ and $I_B$, the average values $b_A$ and $b_B$ of $I_A$ and $I_B$, and the phase difference Δφ between $I_A$ and $I_B$. In the following, a case where N data for one period are used will be explained as an example, but the number of data to be used is not limited to N.

First, the calibration value of the average value $b_A$ of $I_A$ is obtained by dividing the sum of $I_A(n)$(n=0 to (N−1)) by N. Similarly, the calibration value of the average value $b_B$ of $I_B$ is obtained by dividing the sum of $I_B(n)$(n=0 to (N−1)) by N.

[Math. 2]

$$b_A = \frac{1}{N}\sum_{n=0}^{N-1} I_A(n) \quad (7a)$$

$$b_B = \frac{1}{N}\sum_{n=0}^{N-1} I_B(n) \quad (7b)$$

The calibration value of the amplitude $a_A$ of $I_A$ is obtained by the following Expression (9a) using the complex component of the normalized frequency $X_A$ (the following Expression (8a)) obtained by performing a discrete Fourier transform on N $I_A(n)$. Similarly, the calibration value of the amplitude $a_B$ of $I_B$ is obtained by the following Expression (9b) using the complex component of the normalized frequency $X_B$ (the following Expression (8b)).

[Math. 3]

$$X_A = \sum_{n=0}^{N-1} I_A(n)\exp\left(-j\frac{2\pi n}{N}\right) \quad (8a)$$

$$X_B = \sum_{n=0}^{N-1} I_B(n)\exp\left(-j\frac{2\pi n}{N}\right) \quad (8b)$$

[Math. 4]

$$a_A = \frac{2}{N}|X_A| \quad (9a)$$

$$a_B = \frac{2}{N}|X_B| \quad (9b)$$

The calibration value of the phase difference Δφ between $I_A$ and $I_B$ is obtained by the following Expression (10) from the difference between an argument $\angle X_A$ of a complex number $X_A$ and an argument $\angle X_B$ of a complex number $X_B$.

$$\Delta\varphi = \angle X_A - \angle X_B \quad (10)$$

The calculated parameter output unit 1854 outputs the calibration values of the amplitudes $a_A$ and $a_B$ and the average values $b_A$ and $b_B$ obtained by the parameter calculation unit 1853 to the normalization processing unit 181, and outputs the calibration value of the phase difference Δφ calculated by the parameter calculation unit 1853 to the phase difference correction unit 182. The normalization processing unit 181 performs normalization processing of the first sinusoidal wave signal $I_A$ and the second sinusoidal wave signal $I_B$ by using the calibration values of the amplitudes $a_A$ and $a_B$ and the average values $b_A$ and $b_B$, and the phase difference correction unit 182 performs phase correction by using the calibration value of the phase difference Δφ. This calibration method improves the accuracy of calculation of the phase φ compared with the case of using uncalibrated values of the amplitudes $a_A$ and $a_B$, the average $b_A$ and $b_B$, and the phase difference Δφ. In addition, this method also improves the locating accuracy of the position x of the movable mirror dramatically.

Furthermore, it is possible to repeat performing a series of operations of performing calibration of the parameter by the parameter calibration unit 185 using the value of the highly accurate phase φ obtained in this manner. This can further enhance the locating accuracy of the position x of the obtained movable mirror. Therefore, even if the initially used parameter has a low accurate value, it is possible to obtain a desired accuracy by repeated processing by the parameter calibration unit 185 a plurality of times. Specifically, it is sufficient to perform the calibration a plurality of times by using, as parameters of initial values, the average values $b_A$ and $b_B$ obtained from the average of the peaks and valleys of the first sinusoidal wave signal and the second sinusoidal wave signal, the amplitudes $a_A$ and $a_B$ obtained from the difference between the peaks and valleys, and the phase difference Δφ=π/2. Furthermore, even for a change in parameter due to a dynamic change in the optical system, repeated and continuously calibrating allows the parameter to be obtained constantly with high accuracy, and the locating accuracy of the position x of the movable mirror finally obtained is maintained constantly with high accuracy.

(2) One Embodiment of FTIR

Figure 4:
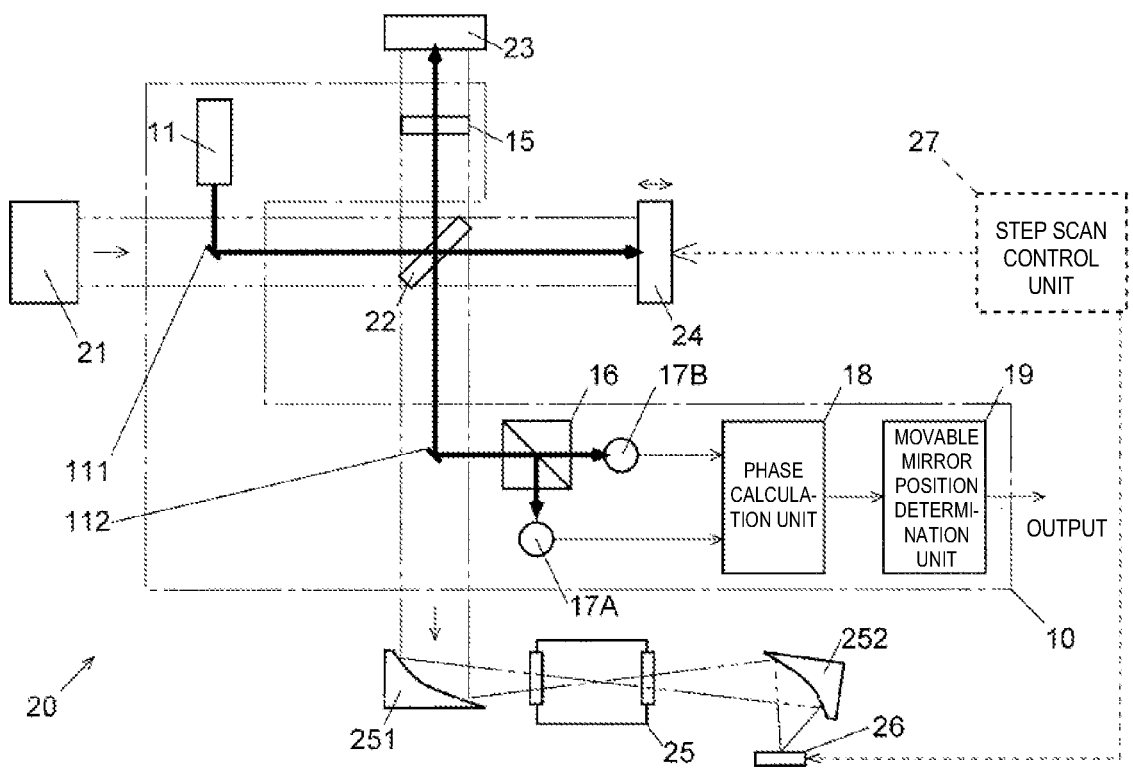
FIG. 4 is a schematic diagram showing an example of an FTIR having an interferometer movable mirror position measurement apparatus of the present embodiment.
Figure 5:
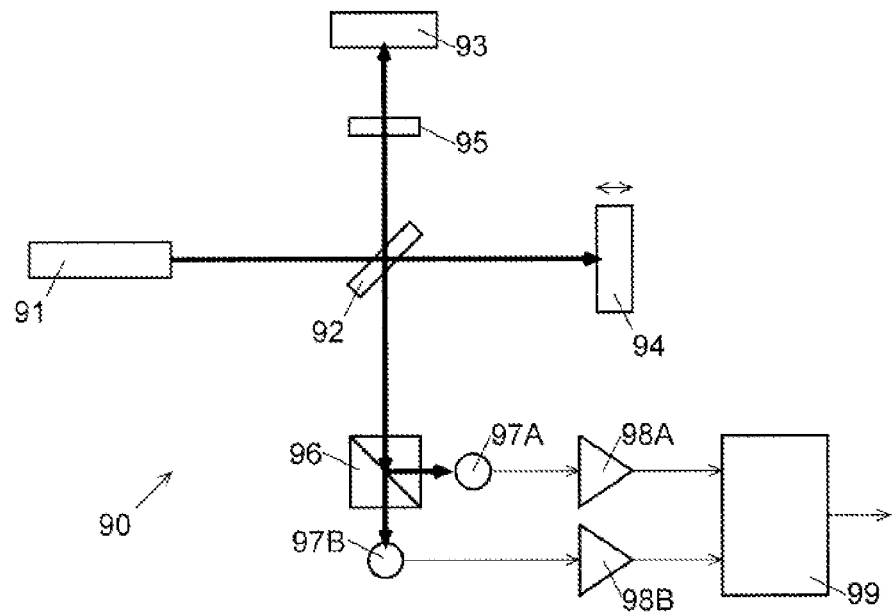
FIG. 5 is a schematic diagram showing an example of a conventional laser interferometer.

Next, the FTIR 20 in which the interferometer movable mirror position measurement apparatus 10 is incorporated will be described with reference to FIG. 4. The FTIR 20 has an infrared light source 21, the beam splitter 22, the fixed mirror 23, the movable mirror 24, a sample chamber 25, and an infrared light detector 26. A first converging mirror 251 which converges infrared light on a sample in the sample chamber 25 is provided in front of the sample chamber 25, and a second converging mirror 252 which converges infrared light on the infrared light detector 26 is provided between the sample chamber 25 and the infrared light detector 26. The infrared light emitted from the infrared light source 21 is applied onto the beam splitter 22, and is split by the beam splitter 22 in two directions toward the fixed mirror 23 and the movable mirror 24. The infrared light reflected by the fixed mirror 23 and the movable mirror 24, respectively, returns to and merges with the beam splitter 22. Here, if the movable mirror 24 is moved, a difference occurs between the optical path of the infrared light reflected by the fixed mirror 23 and the optical path length of the infrared light reflected by the movable mirror 24, and infrared interference light interfered with different phases in accordance with the difference in the optical path length is generated. The infrared interference light is converged by the first converging mirror 251 and is applied onto the sample in the sample chamber 25. The infrared interference light passing through the sample is detected by the infrared light detector 26.

The interferometer movable mirror position measurement apparatus 10 incorporated in the FTIR 20 has, in addition to the above-mentioned laser light source 11, the ⅛ wavelength plate 15, the polarization beam splitter 16, the first light detector 17A, the second light detector 17B, the phase calculation unit 18, and the movable mirror position determination unit 19, a first minute reflection mirror 111 provided between the infrared light source 21 and the beam splitter 22, and a second minute reflection mirror 112 provided between the beam splitter 22 and the first converging mirror 251. The laser light source 11 is disposed at a position away from the optical path (between two parallel dashed lines in FIG. 4) of infrared light between the infrared light source 21 and the beam splitter 22 so that the beam emitted from the laser light source 11 is reflected by the first minute reflection mirror 111 and enters the beam splitter 22. The polarization beam splitter 16 is disposed at a position away from the optical path of infrared light of the beam splitter 22 and the first converging mirror 251 so that the beam passed through the beam splitter 22 is reflected by the second minute reflection mirror 112 and enters the polarization beam splitter 16. Since both the first minute reflection mirror 111 and the second minute reflection mirror 112 are minute, infrared light is allowed to pass almost without disturbing the infrared light.

According to the FTIR 20, it is possible to acquire an interferogram in the similar method to that in the conventional FTIR while the interferometer movable mirror position measurement apparatus 10 is obtaining the position of the movable mirror 24.

The FTIR 20 can further include a step scan control unit 27 configured to repeat performing, at different positions at predetermined intervals, an operation of acquiring a detection signal from the infrared light detector 26 while performing feedback control of halting the movable mirror 24 at a predetermined position. This allows the step scan to be performed with high accuracy.

While the embodiments of the interferometer movable mirror position measurement apparatus and the FTIR according to the present invention have been described above, the present invention is not limited to these embodiments, and various modifications can be made in accordance with the scope of the present invention.

REFERENCE SIGNS LIST

10 . . . Interferometer Movable Mirror Position Measurement Apparatus
11, 91 . . . Laser Light Source
111 . . . First Minute Reflection Mirror
112 . . . Second Minute Reflection Mirror
15, 95 . . . ⅛ Wavelength Plate
16, 96 . . . Polarization Beam Splitter
17A, 97A . . . First Light Detector
17B, 97B . . . Second Light Detector
18 . . . Phase Calculation Unit
181 . . . Normalization Processing Unit
182 . . . Phase Difference Correction Unit
183 . . . Arctangent Processing Unit
185 . . . Parameter Calibration Unit
1851 . . . Data Sampling Unit
1852 . . . Sampling Data Recording Unit
1853 . . . Parameter Calculation Unit
1854 . . . Calculated Parameter Output Unit
19 . . . Movable Mirror Position Determination Unit
191 . . . Phase Connection Unit
192 . . . Position Conversion Unit
20 . . . FTIR
21 . . . Infrared Light Source
22, 92 . . . Beam Splitter
23, 93 . . . Fixed Mirror
24, 94 . . . Movable Mirror
25 . . . Sample Chamber
251 . . . First Converging Mirror
252 . . . Second Converging Mirror
26 . . . Infrared Light Detector
27 . . . Step Scan Control Unit
90 . . . Laser Interferometer
98A . . . First Waveform Shaper
98B . . . Second Waveform Shaper
99 . . . Up-Down Counter

The invention claimed is:

1. An apparatus for determining a position of a movable mirror of an interferometer, the interferometer having a beam splitter, a fixed mirror, and the movable mirror, the apparatus comprising:
  a) a laser light source;
  b) a phase separation optical system configured to cause first light and second light to be separately detected, the first and second light being generated through the emission from the laser light source and the reflection by the fixed mirror and the movable mirror, respectively, the first and second light having different phases from each other;
  c) a signal conversion unit configured to convert from the first light and the second light to generate to a first electrical sinusoidal wave signal and a second electrical sinusoidal wave signal, respectively;
  d) a phase calculation unit configured to perform normalization and phase difference correction on each of the first sinusoidal wave signal and the second sinusoidal wave signal, and then calculate a phase of the first sinusoidal wave signal or the second sinusoidal wave signal in real time; and
  e) a movable mirror position determination unit configured to determine a position of the movable mirror at a predetermined time point from a phase at the predetermined time point on a basis of a relationship between a position of the movable mirror and the phase.

2. The apparatus according to claim 1, further comprising a parameter calibration unit configured to repeat performing processing of:
  acquiring a plurality of intensity values of the first sinusoidal wave signal and the second sinusoidal wave signal at predetermined phase intervals; obtaining an average value of the plurality of acquired intensity values for each of the first sinusoidal wave signal and the second sinusoidal wave signal; and performing a discrete Fourier transform on the plurality of acquired intensity values to obtain an amplitude and a phase difference between the first sinusoidal wave signal and the second sinusoidal wave signal.

3. A Fourier transform infrared spectroscopy comprising:
  an infrared light interference optical system having an infrared light source, a beam splitter, a fixed mirror, and a movable mirror;
  an infrared light detector configured to detect interference light generated by the infrared light interference optical system; and
  the apparatus according to claim 1.

4. The Fourier transform infrared spectroscopy according to claim 3, comprising a step scan controller configured to control the movable mirror so as to repeat performing an operation of halting the movable mirror at different positions at predetermined regular intervals by performing control using a position signal from the movable mirror position determination unit, and acquiring, a plurality of times, a detection signal from the infrared light detector at each of the positions.

5. A Fourier transform infrared spectroscopy comprising:
an infrared light interference optical system having an infrared light source, a beam splitter, a fixed mirror, and a movable mirror;
an infrared light detector configured to detect interference light generated by the infrared light interference optical system; and
the apparatus according to claim 2.

6. The Fourier transform infrared spectroscopy according to claim 5, comprising a step scan controller configured to control the movable mirror so as to repeat performing an operation of halting the movable mirror at different positions at predetermined regular intervals by performing control using a position signal from the movable mirror position determination unit, and acquiring, a plurality of times, a detection signal from the infrared light detector at each of the positions.

\* \* \* \* \*